Patented Nov. 26, 1940

2,223,289

UNITED STATES PATENT OFFICE 2,223,289

BITUMINOUS COMPOSITION

Charles R. Lyons, Philadelphia, Pa., assignor, by mesne assignments, to Stelwagon Manufacturing Company, Philadelphia, Pa., a corporation of Pennsylvania No Drawing. Application January 22, 1937, Serial No. 121,843

7 Claims. (Cl. 134—51)

The present invention relates to bituminous compositions and methods of making said compositions.

It is an important object of the invention to provide bituminous compositions which are characterized by the following unusual combination of qualities, and which by reason thereof are eminently suited for a wide range of useful applications in the industries:

(1) Excellent adhesive and covering properties.

(2) Remarkable resistance to moisture, fumes, chemicals, oxidation and other disintegrative and corrosive influences.

(3) A high degree of flexibility and toughness.

(4) Excellent heat and electrical insulating properties.

(5) Unequalled sound insulating and deadening qualities.

(6) Retention of a substantial proportion of their initial plasticity after drying or setting.

(7) Relatively low cost of ingredients and manufacture.

As illustrative of the many possible applications of the invention may be mentioned coating compositions such as paints, varnishes, enamels and japans, and cements. Not only are these some of the most promising applications of the invention, but they also lend themselves admirably for the specific disclosure such as is required by the patent statutes.

As an indication of the field of usefulness of the compositions herein disclosed, it may be stated that they may be used as protective coatings for floors, vats, tanks, pipe-lines etc. in chemical plants, as well as protective coatings for structural metal and masonry in general. A specific instance of such use is as an anti-corrosive paint for the bottom of ships. This use does not require the addition of a toxic ingredient.

The compositions may also be employed as substitutes for mortar, sealing compositions for pipe joints and as roofing materials either for temporary or permanent use. They may also be used for insulating heavy machinery against vibration and for sound proofing rooms etc. as well as for other purposes where resistance to shock, abrasion etc. is necessary.

Another object of equal importance is to provide bituminous coating compositions which can be readily applied to a surface by conventional methods such as brushing, spraying, etc., which dry quickly and give smooth coatings of excellent covering properties when so applied, and which exhibit exceptional resistance to weathering and ageing.

Another important object is to provide compositions which constitute means for applying continuous metallic films or coatings over intermediate elastic layers of bituminous material.

Still another object is to provide a method for the production of bituminous compositions which is not only more expeditious than prior art methods, but is also susceptible of being practiced on a modern scale of mass production and lends itself admirably to chemical and technical control.

In one of its broadest aspects, the invention resides in providing a bituminous base whose acid value is not over 1.0 and whose saponification value is not greater than 8.0.

For the purposes of the present disclosure, the acid value is a measure of the quantity of free fatty acids present in the material, and may be defined as the number of milligrams of potassium hydroxide required to neutralize the free fatty acids in one gram of material. Likewise, the saponification value is a measure of the quantity of saponifiable matter present in the material, and may be defined as the number of milligrams of potassium hydroxide required for the complete saponification of one gram of the material.

In the preferred embodiment of the foregoing aspect of the invention, the base is prepared by combining a bituminous material having an acid value not over 1.0 and a saponification value not in excess of 8.0 with a resinous material of bituminous origin which is wholly compatible with the bituminous material and which is substantially neutral and unsaponifiable, so that the acid and saponification values of the product will not be in excess of the upper limits above specified.

Among the bituminous materials which are suitable for the purposes of the present invention may be mentioned coal tar pitch and the allied pyrogenous pitches, petroleum pitch and air-blown asphalt. By the term "coal tar pitch" or "coal tar pitch and the allied pyrogenous pitches," I intend to include the pitches corresponding to the tars recovered as by-products from coal carbonized or consumed in coke ovens, illuminating gas works, blast furnaces, gas producers, etc.

As examples of suitable resinous materials I may mention the so-called synthetic resins of the para-coumarone (indene) type. These resins have a large number of properties which render them especially suitable for combination with the bituminous materials above specified. For instance, they are stable and inert and have an acid value of 1.0 or less. In addition to or instead of the para-coumarone resins I may employ bituminous materials such as the asphaltenes which contain a substantial proportion of unsaponifiable resins.

It may be stated at this point that if an otherwise suitable bituminous or resinous material happens to have an acid value or saponification value above the limits previously specified, these values can be reduced to within the optimum limits by various methods such as treatment with lime. In this connection, it should be pointed out that it is not desirable to reduce the acid value or saponification value of the final product to zero. The final product should be slightly on the acid side, provided the acid value is not over 1.0 and the saponification value is not over 8.0.

As will hereinafter be more fully set forth, the combination of the resinous material with the bituminous material is brought about by intimately mixing and fluxing the ingredients. This appears to cause an "internal molecular rearrangement" which results in a remarkable improvement in the desirable characteristics of the ingredients, such as adhesiveness, covering power, resistance to weathering and ageing, etc.

The base prepared by combining the resinous material with bituminous materials may be combined with various fillers, extending agents and solvents in much the same manner as bituminous and asphaltic materials have previously been compounded. The solvent should be substantially neutral and inert and should be a common or mutual solvent for the several ingredients of the base. The proportions of the additional ingredients may be varied within relatively wide limits depending upon a number of factors. Thus the proportion of solvent depends upon the following factors:

(1) The nature of the bituminous base.
(2) The solvent capacity of the particular solvent.
(3) The consistency desired in the product, which in turn depends upon the specific use to which the product is to be applied.

Generally speaking, the proportion of solvent may vary from 20% to 80%, a smaller percentage being used in heavily-loaded paints and enamels to be used for masonry, sealing joints of pipe, roofing, underground pipe lines etc., while a larger amount of solvent is used in the case of light-bodied paints, varnishes etc., especially when it is desired to secure a substantial degree of penetration.

In a more specific aspect, the invention resides in incorporating a "leafed" or "flaked" metal such as lead into a bituminous base. In order to obviate the formation of detrimental amounts of lead soaps, the bituminous base should have a saponification value of 8.0 or less. In its preferred embodiment, the base is preferably made of the ingredients and in the manner previously outlined.

The incorporation of "leafed" lead greatly enhances the desirable properties of the composition, in that when the composition is applied the metal forms a continuous metallic coating over an intermediate layer of bituminous material. The metallic coating forms a perfect seal for the bituminous layer, and prevents the loss of plasticity of the material. The resulting coating is not merely resistant to corrosion and weathering, it has remarkable sound-deadening qualities and renders the material useful wherever these qualities are desirable as in applications involving acoustics insulation, etc. It is to be noted that the composition may well be used for coating metal work without setting up electrolytic action between the metal work and the lead layer, due to the fact that the two are separated by a substantially neutral layer of bituminous material.

In the preferred embodiment of the invention, the metallic lead is added to the bituminous base in the form of a paste made by mixing the "flaked" or "leafed" metal with a substantially neutral vehicle which acts as a plasticizer and stabilizer. As will be more particularly pointed out, I prefer to employ a coal by-product which is intermediate between refined coal naphtha and para-coumarone (indene) resin. This material is wholly compatible with the other ingredients and cooperates with the other ingredients in building up the chemical resistance of the product.

Having outlined the general principles underlying my inventive concept, I shall now proceed to give a few examples by way of illustration.

A coal tar paint may be prepared as follows:

A base is first prepared by mixing para-coumarone resin (melting point 203° to 258° F.) with coal tar pitch (melting point 143° to 148° F.), the proportions being 13% of the resin by weight to 87% of the pitch. The mixture is melted and constantly agitated, the temperature being raised to 350° F. The mixture is kept at this temperature until it becomes homogeneous. This generally requires about four hours. The temperature is then allowed to drop to 225° F. and a solvent such as crude coal tar naphtha is added, the proportions being 56% to 60% by volume of the base and 40% to 44% of the solvent.

The finished product conforms approximately to the following tests and requirements:

Specific gravity at 25° C./25° C._____ 1.07 to 1.12
Specific viscosity (Engler Scale—50 c. c. at 25° C.)____ 15 to 20
Flash point (tag open cup)_____ 80° F. minimum
Total bitumen soluble in carbon disulphide_____ 88% to 96%
Distillation A. S. T. M. D20–30:
 To 200° C_____ 20% by weight minimum
 To 235° C_____ 25% by weight minimum
 To 300° C_____ 45% by weight maximum
Softening point of distillation residue (A. S. T. M. D36–26)_____ 55 to 75° C.
Drying time:
 Set to touch_____ 3 hours maximum
 Dry hard_____ 6 hours maximum A metallic pigment may be incorporated into the foregoing composition. The pigment may advantageously be "flaked" or "leafed" lead metal in the form of a paste. The preferable proportions are 4 to 6 pounds of lead paste to a gallon of the composition.

The metallic lead paste may advantageously be made as follows:

"Leafed" or "flaked" metallic lead, which will screen 99% through a 200 mesh screen or 95% through a 300 mesh screen, is intimately mixed with a neutral vehicle such as a coal by-product oil known as "Nevinol," or #2 Refined heavy oil." The proportions are 90% lead and 10% of the vehicle.

"Nevinol" is a polymer having a viscous liquid consistency and ranks as an intermediate high-boiling product between refined coal naphtha and para-coumarone (indene) resin. It does not contain any low boiling solvent and is almost completely non-drying at ordinary room temperatures. Furthermore, it is substantially neutral in reaction and unsaponifiable (maximum saponification value, 4.0). Hence, it is wholly compatible with the other ingredients and serves as a stabilizer and plasticizer for the composition. It aids to a considerable degree in the fusing of the lead flakes into a continuous lead film.

A coal tar enamel may be made as follows:

Para-coumarone resin is melted and mixed with coal tar pitch in the proportion of 8% resin and 62% coal tar pitch. The temperature is raised to 350° F. and held at this point while the mixture is constantly agitated until the fluxing is complete, as indicated by the fact that the mixture becomes homogeneous. The time required is about 4 hours. The next step is to add 4% of graphite (54% graphitic carbon) to the molten mass with continuous agitation for at least an hour. Then 26% of talc, which will screen 80% through a 200 mesh screen, is added slowly as filler, and the mass is agitated for at least two hours, during which time the molten mass is held at 350° F. At no time during the processing should the temperature be permitted to rise above 400° F.

The melting point of the product varies from 180° to 210° depending upon the melting point of the coal tar pitch. This provides a way of controlling the desired melting point of the finished product.

A metallic pigment such as "leafed" lead may be incorporated into the composition as in the previous example, the proportions depending upon the particular use to which the final product is to be put.

An asphalt enamel may be prepared in the following manner:

A base is first prepared by thoroughly mixing and fluxing para-coumarone (indene) resin with air-blown petroleum asphalt. I may advantageously employ a resin with a melting point (ring and ball method) ranging from 258° to 275° F., and an air-blown asphalt with a melting point ranging from 190° to 205° F. Suitable proportions are 18% of the resin by weight to 47% of the asphalt. The mixture is digested, preferably with constant mechanical agitation, at a temperature of from 400° to 450° F. for ten to twelve hours. The temperature is then permitted to drop to about 225° F., and a suitable neutral common solvent is added in sufficient quantities to complete the 100%. The common solvent may be made up by mixing 65% of coal tar naphtha, 5% "Nevinol" and 30% "Stoddard" specification solvent.

The product flows with difficulty in the cold and has the following technical specification:

| Materials | Approximate quantities |
|---|---|
| Air-blown asphalt (melting point 190°–205° F.) | 46.15%. |
| Para-coumarone (indene) resin (melting point 258°–275° F.) | 18.85%. |
| Common solvent | 35.0%. |
| *Finished product* | |
| Float test at 32° C. (A. S. T. M. D139–27) | 15–65. |
| Loss on heating (A. S. T. M. D6–33; 50 grams, 5 hours, 325° F.) | 30–37. |
| Softening point of residue (ring and ball method) (A. S. T. M. D36–26). | 155° F. minimum. |

An asphalt varnish may be made in the following manner:

A base is prepared by combining 35% by weight of para-coumarone resin with 65% by weight of air-blown asphalt in the manner above indicated for the asphalt enamel. The base is mixed with a common neutral solvent, in the proportion of 52% to 54% of the base by volume to 46% to 48% of the solvent. The common solvent may consist of coal tar naphtha, "Nevinol" and Stoddard (specification) solvent in the proportions previously specified. Then there is added a metallic pigment paste such as "leafed" lead in the proportion of about 4 to 6 pounds of paste per gallon, depending upon the thickness of the film desired.

The foregoing formula represents a "brushing" or "dipping" consistency. If the varnish is to be sprayed, 38% to 40% of the base by volume is mixed with 60% to 62% of a common solvent, and then the metallic paste is added.

A bituminous coating composition may be made by preparing a base consisting of liquid asphaltum (asphaltic oil), petroleum pitch and a mineral filler such as talc and incorporating lead paste and solvent naphtha therewith. I prefer to use a liquid asphalt having a viscosity of 100 to 150 seconds (122° F.) as determined by the Saybolt furol viscosimeter according to the standard known as A. S. T. M. D88–36, and a petroleum pitch having a melting point of 180° F. (ring and ball method). The liquid asphaltum contains asphaltenes which consist essentially of resinous material.

The preferred proportions are indicated by the following table:

| Base | Percentage by weight |
|---|---|
| Liquid asphalt | 54 to 64. |
| Petroleum pitch | 6 to 10. |
| Mineral filler | 30 to 36. |
| *Compound* | |
| Base as above | 34 to 40. |
| Metallic lead paste | 40 to 44. |
| Solvent naphtha | 20 to 22. |

A bituminous cement may be readily made by incorporating a metallic pigment with the base of the foregoing formula. The preferable proportions are as follows:

|  | Per cent |
|---|---|
| Base | 46 to 50 |
| Metallic lead paste | 50 to 54 |

The various compositions which constitute embodiments of the present invention may be applied in the various ways known to the art; e. g. by dipping, spraying, flowing, brushing or troweling, depending of course upon their consistencies.

The foregoing specification includes the essential and distinctive thought underlying the present invention. Although the invention has been described with considerable detail and particularly and certain specific terms and language have been used, it is to be distinctly understood that the present disclosure is intended to be illustrative rather than restrictive, and that no limitations are to be imported which are not required by the language of the claims and the state of the prior art. It is to be further understood that the invention is not dependent upon any explanations or theories which have been set forth as descriptive of the actions involved, nor dependent upon the soundness or accuracy of any theoretical statements so advanced.

I claim:

1. A composition of the class described, comprising a bituminous material, a compatible resinous material of bituminous origin, a common solvent for both said ingredients, a metallic pigment and a plasticizer, said composition having an acid value not in excess of 1.0 and a saponification value not in excess of 8.0.

2. The composition defined in claim 1, said bituminous material being petroleum pitch.

3. The composition defined in claim 1, said bituminous material being petroleum pitch and said resinous material being asphaltenes.

4. The composition defined in claim 1, said bituminous material being air-blown asphalt.

5. The composition defined in claim 1, said bituminous material being air-blown asphalt and said resinous material being para-coumarone (indene) resin.

6. The composition defined in claim 1, said pigment being "leafed" lead, and said plasticizer being a polymer intermediate solvent naphtha and para-coumarone (indene) resin.

7. A composition of the class described, comprising a bituminous material, a compatible resinous material of bituminous origin, a common solvent for both said ingredients, and a "leafed" lead pigment, said composition having an acid value not in excess of 1.0 and a saponification value not in excess of 8.0.

CHARLES R. LYONS.